May 23, 1950     H. B. CONANT     2,508,446
ALTERNATING CURRENT RECTIFIER BRIDGE INSTRUMENT
Filed Aug. 22, 1947     2 Sheets-Sheet 1

INVENTOR.
*Harold Beecher Conant*
BY
ATTORNEY

May 23, 1950   H. B. CONANT   2,508,446
ALTERNATING CURRENT RECTIFIER BRIDGE INSTRUMENT
Filed Aug. 22, 1947   2 Sheets-Sheet 2

INVENTOR.
Harold Beecher Conant
BY
ATTORNEY

Patented May 23, 1950

2,508,446

UNITED STATES PATENT OFFICE 2,508,446

ALTERNATING CURRENT RECTIFIER BRIDGE INSTRUMENT

Harold Beecher Conant, Lincoln, Nebr.

Application August 22, 1947, Serial No. 770,155

7 Claims. (Cl. 171—95)

The subject matter of this invention is electrical engineering and more particularly electrical measurements, the primary object being to provide a device in the nature of the well-known Wheatstone bridge for the measurement of resistance, so modified as to permit the accurate measurement of alternating current impedances.

It is readily understood by those skilled in the art that bridge methods for resistance measurements are the most accurate of known methods. The accuracy of such measurements is very high because they are zero methods and further because a comparison is made directly with standardized resistances.

The most important object of this invention, therefore, is to improve upon the Wheatstone bridge by the provision of an alternating current bridge adaptable not only to measure pure resistances with a high degree of accuracy, but to determine inductive and capacitive alternating current impedance values.

Another important object of this invention is the provision of an alternating current bridge instrument having a conventional direct current galvanometer as the null indicator, permitting direct measurement of resistances and impedances over an extensive range.

The nature and advantages of the invention will be better understood when the following detailed description is read in connection with the accompanying drawings, the latter being merely illustrative of the principles embodied in the invention, and in which drawings.

Figure 1:
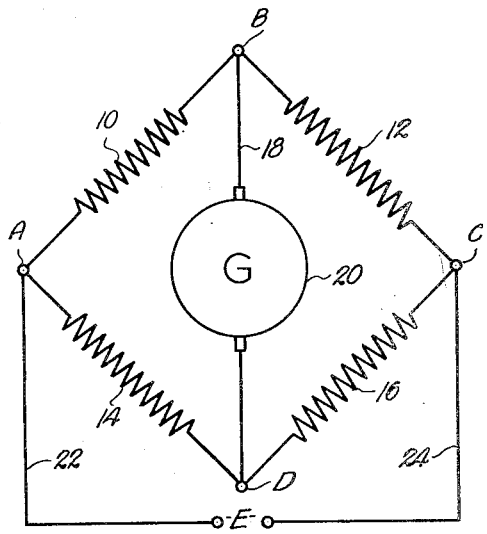
Fig. 1 is a schematic circuit diagram showing for illustrative purposes, a conventional Wheatstone bridge.

The simple Wheatstone bridge shown diagrammatically in Fig. 1, constitutes a divided circuit defined by points ABC and ADC respectively. These two parallel circuits have four resistances interposed therein, designated by the numerals 10, 12, 14 and 16 respectively. The resistances 10 and 12 are disposed within the branch defined by points ABC while resistances 14 and 16 are in branch ADC.

The resistances 10, 12 and 16 usually consist of sets of wire coils whose values in ohms are known. The resistances 10 and 12 are called "ratio arms" while resistance 16 is a rheostat of variable resistance. The resistance 14 is the unknown component to be measured.

The two branches of the circuit have their arms connected by a conductor 18 joining points B and D and have a direct current galvanometer 20 interposed therein. Points A and C have connection with a battery (not shown) or other source of direct current potential through lead lines 22 and 24 respectively, the potential applied to the bridge circuit being designated E.

It is clear that balance between the resistances 10, 12, 14 and 16 is indicated by the absence of current in the conductor 18 which forms the connection between the branches ABC and ADC of the circuit. The resistances 10 and 12 may be selected to present any given ratio. By varying the resistance in the rheostat 16 until no current flows through the conductor 18, the galvanometer 20 will read zero. The unknown resistance 14 may then be determined from the known resistances 10, 12 and 16.

Wheatstone bridge methods may also be used for measuring effective impedance when the circuit is supplied with alternating current. It is necessary that arms 14 and 16 be of the same kind of impedance and of the same value of Q to avoid errors due to phase shift.

Any alternating current potential difference due to unbalance will have no effect on the direct current galvanometer 20. A rectifier may be connected to the galvanometer 20 but this is unsuitable because such rectifier would require a large threshold voltage for its operation. Furthermore, although such an arrangement may indicate unbalance, it would fail to show the direction of such unbalance.

Therefore, the operator usually uses headphones connected in place of the galvanometer. This method also fails to indicate the direction of unbalance, and considerable unbalance is required before an audible sound can be heard in the headphones.

An alternating current galvanometer might conceivably be employed, but as in the case of using a rectifier as above described, a large threshold voltage would be required to cause the same to overate and would not indicate direction of unbalance.

The first step in modification of the conventional bridge is shown in Fig. 1 and consists of dividing the bridge into a pair of halves, the first including impedances 10 and 14 and the second comprising the resistances 12 and 16 and the galvanometer 20.

A pair of rectifying means 26 and 28 is then inserted in the circuit consisting of any type of rectifier suitable to the frequency, voltage and current requirements of the particular measurement. The rectifier 26 is disposed to connect impedances 10 and 12 while impedances 14 and 16 are joined electrically by the rectifier 28.

Figure 2:
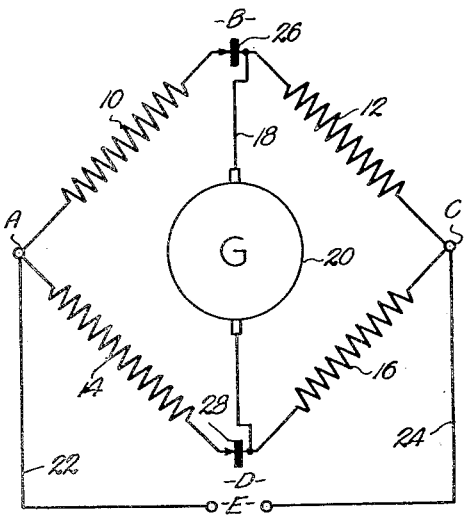
Fig. 2 is a schematic circuit diagram showing the first step in forming one embodiment of my invention.

It is to be noted as shown in Fig. 2 that the rectifiers 26 and 28 are arranged to receive current from the impedances 10 and 14 respectively and to direct the same toward the impedances 12 and 16 respectively.

With the conventional Wheatstone bridge as shown in Fig. 1 modified in accordance with Fig. 2, a pulsating direct current voltage appears across both the impedances 12 and 16. If the bridge is balanced therefore, both voltages are equal and the voltage differential at the galvanometer 20 is zero resulting in a null reading. If the value of the impedance 16 is greater than the value of the impedance 14, a higher voltage develops across impedance 16. If, on the other hand, the value of the impedance 16 is smaller than the value of the impedance 14, a lower voltage develops across the impedance 16. Therefore, the needle of the galvanometer 20 will swing to the right for example indicating too much resistance in the variable element 16 or such needle will swing to the left to indicate that there is insufficient resistance in the rheostat 16 to obtain balance in the bridge.

It is clear that the arms having impedances 10 and 14 are also carrying a pulsating direct current. While this might be desirable for measuring the capacity of electrolytic condensers, it is wholly unsuited for measuring the alternating current impedance of a paper or a mica dielectric condenser or an iron core reactor for example.

Figure 3:
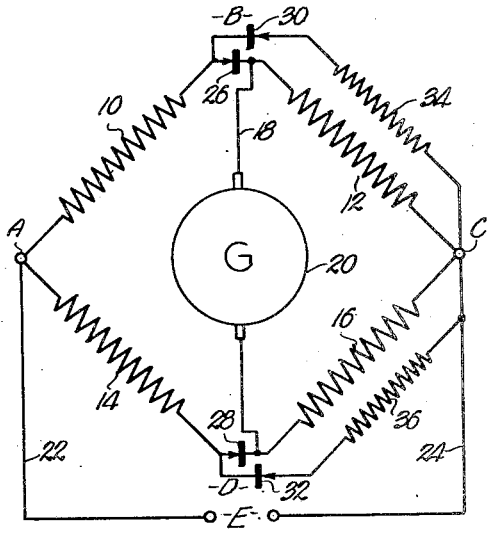
Fig. 3 is a schematic circuit diagram showing the second step in forming said embodiment of my invention.

In order to maintain a substantially alternating current in the impedances 10 and 14 and substantially direct current in the impedances 12 and 16, the bridge shown in Fig. 3 is further modified as illustrated in Fig. 3. Rectifier means 30 and 32 similar to the rectifiers 26 and 28 are connected in parallel with the two series paths defined by rectifier 26 and impedance 12 and by rectifier 28 and impedance 16. A pair of impedances 34 and 36 are interposed between point C and the rectifiers 30 and 32 respectively. It is preferable that these impedances be equal to the impedances 12 and 16 respectively. The rectifiers 30 and 32 are arranged to conduct a current in the opposite direction to the current being passed by the rectifiers 26 and 28, the currents being passed by rectifiers 26 and 30 being substantially equivalent and the currents passed by rectifiers 28 and 32 being of substantially the same intensity.

Figure 4:
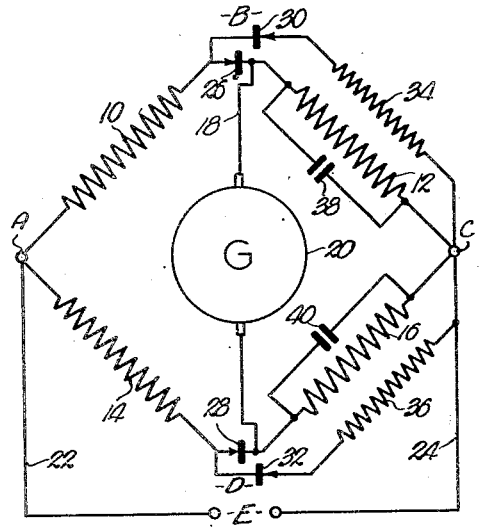
Fig. 4 is a schematic circuit diagram showing said embodiment of my invention in full.

It is more convenient and economical to make the elements 10, 12 and 16 resistive rather than capacitive or inductive. When so doing, the phase shift which occurs when the impedance 14 represents a condenser or a reactor will result in error as well as a loss of sensitivity. In the case of a condenser, voltage appears across the impedance 16, 90° before a similar voltage appears across the impedance 12. When a reactor is being measured, the voltage across impedance 16 appears 90° after an appearance of voltage across the impedance 12. The bridge circuit is further modified as shown in Fig. 4 in order that the voltages may appear across impedances 12 and 16 simultaneously. Such voltages are caused to persist for at least 90° in the form of charges on a pair of condensers 38 and 40. These condensers 38 and 40 are interposed in the arms of the bridge having impedances 12 and 16 therein respectively and are arranged in parallel therewith. The capacities of the condensers 38 and 40 should be selected according to the resistances and according to the voltages appearing across the impedances 12 and 16.

As a specific example of the use of a bridge modified in accordance with Fig. 4, a test was made utilizing 110 volt 60 cycle lighting circuit for the supply voltage E. Such voltage was supplied to the bridge circuit through a 2,000 ohm limiting resistor. The impedance 10 was rendered variable from zero to 100,000 ohms and the resistance of element 14 was 100,000 ohms. The rectifying means 26, 28, 30 and 32 were all copper oxide rectifiers one-half inch in diameter. During the particular test that was conducted the impedances 34 and 36 were eliminated as not essential. The arms containing impedances 12 and 16 were made from a series of 10 each of copper oxide rectifiers identical to the rectifiers 26, 28, 30 and 32 and were connected to conduct in the same direction as the rectifiers 26 and 28.

The object of this arrangement was to utilize the well-known current density curve of copper oxide rectifiers to make the arms 12 and 16 variable from 2,000 ohms at the minimum current of one milliampere to 200 ohms at the maximum current of 25 milliamperes in order to develop a higher voltage across arms 12 and 16 at the minimum current.

The values to be tested were connected in parallel with the impedance 14 to the end that all impedance values over the range would result in limiting the value of the arm 14 to some value between zero and 100,000 ohms. The condensers 38 and 40 were 10 microfarad electrolytics. It was found that condensers as small as 50 micromicrofarads or resistors as large as 40 megohms could be measured.

Another experiment utilizing the bridge modified as shown in Fig. 4 employed thermionic diodes (6H6 radio tubes) for the rectifiers 26, 28, 30 and 32. Using the same source of 60 cycle alternating current through the same limiting resistor, the arm 10 was entirely omitted as was the impedance 34. The impedance 14 was fixed at one megohm and test values were connected in parallel therewith. The impedance 16 was set at 30,000 ohms and the impedance 12 was a 100,000 ohm potentiometer. The galvanometer 20 was connected to the movable contact of the potentiometer so that it could be adjusted to the voltage point on impedance 12 corresponding to the voltage developed across impedance 16 by the current through the impedance under test across impedance 14. It was possible to measure condensers through this modification having values as small as two micromicrofarads and resistors as large as 1,000 megohms. It is notable that this last departure functions similarly to a potentiometer bridge.

These last two illustrations show possible departures from the conventional Wheatstone bridge that fall within the basic operating principles of the modifications shown in Figs. 2, 3 and 4.

Figure 5:
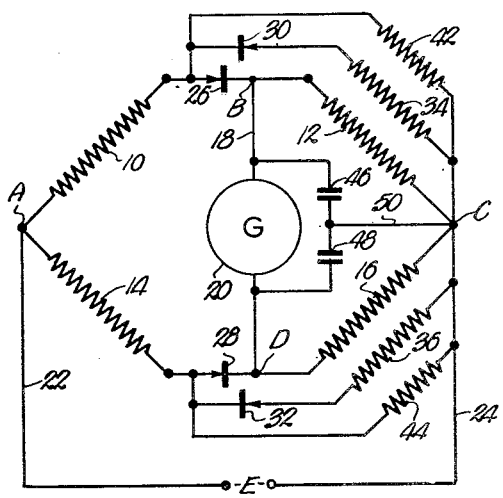
Figs. 5, 6 and 7 are each schematic circuit diagrams showing modified forms of my invention.

Further modification of the bridge is illustrated in Fig. 5 and constitutes a very useful variation of the Wheatstone bridge and extends its range still further. This variation provides for very smooth operation, particularly if the bridge is to be employed for measuring impedances of extremely small values. It is well known that when measuring small impedance values, it is desirable to pass a considerable current through the bridge so that a small variation in impedance will result in a readable voltage differential. The current carrying capacity of rectifiers and their inverse voltage ratings limit however, the current which can be passed through the arms 10 and 14.

To the end that a current of any desired value may be directed through the impedances 10 and 14, a pair of shunt impedances 42 and 44 are connected in series with the impedances 10 and 14, and a parallel with the series circuits comprising rectifier 26 and impedance 12 and rectifier 28 and impedance 16 respectively. These shunt impedances 42 and 44 will carry the excess current from the potential E whereby such potential E is not limited. Impedances 42 and 44 are selected to have a value that any voltage drop thereacross will not be in excess of the safe inverse voltage rating of the rectifiers 26, 28, 30 and 32.

A pair of condensers 46 and 48 are also interposed in the circuit shown in Fig. 5. These condensers 46 and 48 are in parallel with the impedances 12 and 16 respectively in the same manner as above described with respect to Fig. 4 and discharge through the medium of a conductor 50 having connection with point C.

Figure 6:
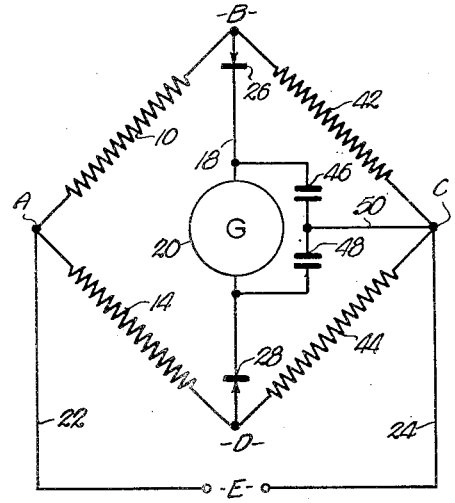

A still further modification of the bridge measuring device above described is set forth in Fig. 6. When connection is made in accordance with the structure of Fig. 5, the reverse current return circuits defined by rectifier 30 and impedance 34 and by rectifier 32 and impedance 36 serve no useful purpose and may be preferably omitted. Likewise, it is possible, and in some cases even desirable, to omit the impedance arms 12 and 16 whereby to remove such impedance from across the condensers 46 and 48. This will keep the condensers 46 and 48 from discharging so rapidly. The values of the impedances 12 and 16 may be increased or decreased if desired to control the discharge rate of the condensers 46 and 48.

With rectifiers 30 and 32, impedances 34 and 36 and impedances 12 and 16 all omitted, the shunt impedances 42 and 44 assume the full function of the impedances 12 and 16 as shown in Fig. 6. The rectifiers 26 and 28 are arranged in the line 18 to direct current in opposite directions toward the galvanometer 20 and toward the condensers 46 and 48 respectively.

Assuming that the bridge shown in Fig. 6 is in a condition of balance and sufficient current is passing through impedances 42 and 44 to cause a given voltage to drop thereacross so that the same voltage with reference to the arm having impedance 42 therein appears at both arms having impedances 14 and 44 therein, said voltage will cause an initial current through the rectifiers 26 and 28 thereby serving to charge the condensers 46 and 48. As long as the circuit remains balanced, the rectifiers 26 and 28 will supply only sufficient current to maintain the condensers 46 and 48 charged. Thus, the load on the bridge circuit by the indicating circuit is substantially nil.

Since the direct current galvanometer 20 is connected in parallel with the two condensers 46 and 48 which are in turn in series and both charged to the same voltage, the voltage differential across the galvanometer 20 is zero and no current flows therethrough. This places the galvanometer 20 in a substantially pure direct current circuit which is completely independent of phase relationship of the currents in impedances 10, 42, 14 and 44.

If the impedance of the impedance 14 is suddenly increased, the voltage will decrease across the impedance 44 with respect to the impedance 42. In the conventional bridge circuit this would cause the pointer of the galvanometer 20 to slam against the stop with likely damage thereto. In the circuit shown in Fig. 6, the result is a cessation of the charging pulses through the rectifier 28 until the charge on the condenser 48 drops to the new voltage value. The galvanometer 20, therefore, moves relatively slowly so that it cannot be damaged.

Figure 7:
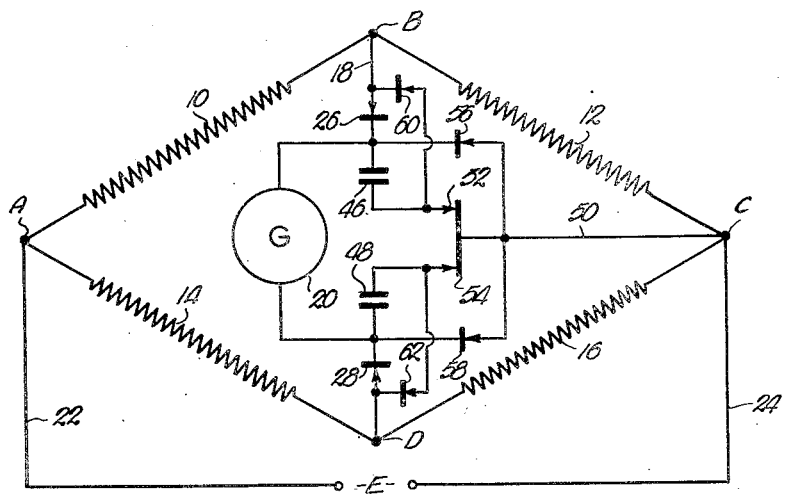

Fig. 7 illustrates the manner in which full wave rectifiers may be interposed in the bridge circuit if desired. Two pairs of rectifiers 26 and 28 and 52 and 54 are arranged in series with condensers 46 and 48 to conduct charging current from points B and D to the common conductor 50 attached to point C. Two additional pairs of rectifiers 56 and 58 and 60 and 62 are arranged in series with the condensers 46 and 48 to conduct charging current from terminal C through common conductor 50 in the same direction through condensers 46 and 48 to terminal points B and D.

It is to be noted that through the arrangements above described, any phase difference in any of the bridge arms will not reduce the sensitivity of the galvanometer 20. In the circuits illustrated in Figs. 2 to 5 inclusive, the indicating portion of the circuit contains only the galvanometer 20, all of the rectifiers and capacitors being connected into the bridge proper of the circuit. In Figs. 6 and 7 the indicating portion of the circuit includes not only the galvanometer but all of the rectifying means and condensers. In Figs. 2, 3 and 4, the total current through the bridge flows through the rectifiers so that they operate on an efficient portion of their current density curve. In all cases, these rectifiers therefore, are effectively biased thereby eliminating any need of resorting to separate energizing means in order to attain good sensitivity. In the modifications shown in Figs. 6 and 7, it is to be noted however, that very little current flow passes through the rectifying means shown.

Manifestly measuring instruments of the bridge type designed to operate on alternating current may be made having many additional modifications without departing from the spirit of this invention and the principles of operation contained therein. It is, therefore, desired to be limited only by the scope of the appended claims.

Having thus described the invention, what is claimed as new and desired to be secured by Letters Patent is:

1. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said point of interconnection, said rectifiers being arranged for passage of current from one pair of said impedances to the other pair of impedances; a direct current responsive instrument interconnecting the pairs of impedances at their points of connection with said rectifier means; and a second pair of rectifier means arranged in said bridge to maintain a substantially alternating current circuit in said one pair of impedances and a substantially direct current circuit in the other pair of impedances, said direct current responsive instrument being connected within said direct current circuit.

2. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said position of interconnection, said rectifiers being arranged for passage of current from one pair of said impedances to the other pair of impedances; a direct current responsive instrument interconnecting the pairs of impedances at their points of connection with said rectifier means; and a second pair of rectifier means arranged in said bridge to maintain a substantially alternating current circuit in said one pair of impedances and a substantially direct current circuit in the other pair of impedances, said direct current responsive instrument being connected within said direct current circuit, said second pair of rectifier means being disposed for passage of current from one of said conductors to said one pair of impedances in a direction opposite to the direction of flow of current through said first pair of rectifier means.

3. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said point of interconnection, said rectifiers being arranged for passage of current from one pair of said impedances to the other pair of impedances; a direct current responsive instrument interconnecting the pairs of impedances at their points of connection with said rectifier means; a second pair of rectifier means arranged in said bridge to maintain a substantially alternating current circuit in said one pair of impedances and a substantially direct current circuit in the other pair of impedances, said direct current responsive instrument being connected within said direct current circuit; and means for maintaining currents through all of said rectifier means substantially the same.

4. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said point of interconnection, said rectifiers being arranged for passage of current from one pair of said impedances to the other pair of impedances; a direct current responsive instrument interconnecting the pairs of impedances at their points of connection with said rectifier means; a second pair of rectifier means arranged in said bridge to maintain a substantially alternating current circuit in said one pair of impedances and a substantially direct current circuit in the other pair of impedances, said direct current responsive instrument being connected within said direct current circuit; and means for maintaining currents through all of said rectifier means substantially the same, said last mentioned means comprising elements for decreasing the flow of current through said second pair of rectifier means.

5. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said point of interconnection, said rectifiers being arranged for passage of current from one pair of said impedances to the other pair of impedances; a direct current responsive instrument interconnecting the pairs of impedances at their points of connection with said rectifier means; a second pair of rectifier means arranged in said bridge to maintain a substantially alternating current circuit in said one pair of impedances and a substantially direct current circuit in the other pair of impedances, said direct current responsive instrument being connected within said direct current circuit; and means for maintaining the direct current potentials in said direct current circuit when a phase differential is present between the currents flowing through the impedances of said one pair thereof.

6. A bridge circuit for electrical measurements comprising a pair of conductors having connection with a source of alternating current voltage; two pairs of impedances joined with said conductors, each pair of impedances being interconnected and joined to a conductor respectively, one impedance of each pair being in a series circuit respectively and each having a rectifier means interposed therebetween at said point of interconnection, said rectifiers being arranged for passage of current from one pair of said impedances to the other pair of impedances; a direct current responsive instrument interconnecting the pairs of impedances at their points of connection with said rectifier means; a second pair of rectifier means arranged in said bridge to maintain a substantially alternating current circuit in said one pair of impedances and a substantially direct current circuit in the other pair of impedances, said direct current responsive instrument being connected within said direct current circuit; and means for maintaining the direct current potentials in said direct current circuit when a phase differential is present between the currents flowing through the impedances of said one pair thereof, said last mentioned means comprising at least one capacitor, said capacitor being connected in parallel with one of the impedances in said direct current circuit.

7. A bridge circuit as set forth in claim 5 wherein said circuit is provided with shunt impedances for receiving excess current passing through said one pair of impedances whereby alternating current may be directed through the latter that is of greater value than the current carrying capacity of said first mentioned rectifier means.

HAROLD BEECHER CONANT.

REFERENCES CITED

The following references are of record in the file of this patent:

UNITED STATES PATENTS

| Number | Name | Date |
|---|---|---|
| 1,964,141 | Rhodes et al. | June 26, 1934 |
| 1,985,095 | Hoare | Dec. 18, 1934 |